United States Patent
Kokubun

(10) Patent No.: US 11,861,874 B2
(45) Date of Patent: Jan. 2, 2024

(54) IMAGING APPARATUS, IMAGING CONTROL METHOD, AND IMAGING CONTROL PROGRAM

(71) Applicant: FUJIFILM Corporation, Tokyo (JP)

(72) Inventor: Hideaki Kokubun, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/932,657

(22) Filed: Sep. 15, 2022

(65) Prior Publication Data
US 2023/0098738 A1 Mar. 30, 2023

(30) Foreign Application Priority Data
Sep. 30, 2021 (JP) .................. 2021-162017

(51) Int. Cl.
*G06K 9/00* (2022.01)
*G06V 10/141* (2022.01)
*G06V 10/60* (2022.01)

(52) U.S. Cl.
CPC ............ *G06V 10/141* (2022.01); *G06V 10/60* (2022.01); *G06T 2207/10144* (2013.01); *G06T 2207/10148* (2013.01)

(58) Field of Classification Search
CPC .................. G06V 10/141; G06V 10/60; G06T 2207/10144; G06T 2207/10148
See application file for complete search history.

(56) References Cited

U.S. PATENT DOCUMENTS

| | | | | |
|---|---|---|---|---|
| 9,247,152 B2* | 1/2016 | Geiss | .................. | H04N 23/741 |
| 2011/0038563 A1* | 2/2011 | Bremer | .............. | G06K 7/10752 |
| | | | | 382/313 |
| 2012/0038810 A1* | 2/2012 | Taniguchi | ......... | H01L 27/14621 |
| | | | | 348/308 |
| 2014/0267914 A1* | 9/2014 | Sfaradi | ................ | H04N 23/741 |
| | | | | 348/571 |
| 2015/0092098 A1* | 4/2015 | Konishi | ................. | H04N 23/72 |
| | | | | 348/333.11 |
| 2015/0163434 A1* | 6/2015 | Ishibashi | .............. | H04N 25/704 |
| | | | | 348/66 |
| 2017/0295313 A1* | 10/2017 | Koizumi | .............. | H04N 23/667 |
| 2020/0036884 A1* | 1/2020 | Jeong | ........................ | G06T 5/50 |

FOREIGN PATENT DOCUMENTS

| | | |
|---|---|---|
| JP | 2009-089105 A | 4/2009 |
| JP | 2010-219958 A | 9/2010 |
| JP | 2015-068959 A | 4/2015 |

* cited by examiner

*Primary Examiner* — Avinash Yentrapati
(74) *Attorney, Agent, or Firm* — Studebaker & Brackett PC

(57) ABSTRACT

An imaging apparatus, an imaging control method, and an imaging control program are provided. A digital camera includes an imaging element including a first light-receiving region in which a pixel group including focal point detection pixels is arranged and a second light-receiving region in which a pixel group not including the focal point detection pixels is arranged, and a system control unit, in which the system control unit performs a recording imaging control of causing the imaging element to perform imaging in a first exposure time period and a display imaging control of causing the imaging element to perform imaging by setting an exposure time period of the second light-receiving region as the first exposure time period and setting an exposure time period of the first light-receiving region as a second exposure time period.

17 Claims, 10 Drawing Sheets

IMAGING APPARATUS, IMAGING CONTROL METHOD, AND IMAGING CONTROL PROGRAM

CROSS-REFERENCE TO RELATED APPLICATIONS

The present application claims priority under 35 U.S.C. § 119 to Japanese Patent Application No. 2021-162017 filed on Sep. 30, 2021. Each of the above application is hereby expressly incorporated by reference, in its entirety, into the present application.

BACKGROUND OF THE INVENTION

1. Field of the Invention

The present invention relates to an imaging apparatus, an imaging control method, and a non-transitory computer recording medium storing an imaging control program.

2. Description of the Related Art

JP2009-089105A discloses a solid-state imaging device that sequentially and cyclically repeats, for each frame, two or more readout modes including a live view readout mode in which an imaging signal for live view display is read out, and a focal point detection and automatic exposure readout mode in which an imaging signal to be used for a focal point detection signal and automatic exposure light measurement information is read out from a solid-state imaging element.

JP2015-068959A discloses an imaging apparatus including an imaging element that includes a row which includes a focal point detection pixel, and a row which does not include the focal point detection pixel and consists of an imaging pixel. This imaging apparatus calculates a first charge accumulation time period for the imaging pixel and a second charge accumulation time period that is used for the focal point detection pixel and is longer than the first charge accumulation time period based on a light measurement result of a light measurement unit, drives the row not including the focal point detection pixel in the first charge accumulation time period and drives the row including the focal point detection pixel in the second charge accumulation time period, displays an image signal obtained from the imaging pixel of the row driven in the first charge accumulation time period by periodically updating the image signal, and performs focal point detection processing of a phase difference type based on an image signal obtained from the focal point detection pixel of the row driven in the second charge accumulation time period.

JP2010-219958A discloses an imaging apparatus comprising a switching unit that switches between an all pixel readout mode in which signals of all pixels of a plurality of pixels are read out and a thinned-out readout mode in which signals of a plurality of pixels are read out in a thinned-out manner, and a control unit that performs a charge accumulation control independently between an imaging row used for image generation and a focal point detection row including a focal point detection pixel in a case where the switching unit switches to the thinned-out readout mode.

SUMMARY OF THE INVENTION

An imaging apparatus of one embodiment according to the disclosed technology comprises an imaging element including a first light-receiving region in which a pixel group including focal point detection pixels is arranged and a second light-receiving region in which a pixel group not including the focal point detection pixels is arranged, and a processor, in which the processor is configured to perform a first control of causing the imaging element to perform imaging in a first exposure time period, and perform a second control of causing the imaging element to perform imaging by setting an exposure time period of the second light-receiving region as the first exposure time period and setting an exposure time period of the first light-receiving region as a second exposure time period.

An imaging control method of another embodiment according to the disclosed technology is an imaging control method of controlling an imaging element including a first light-receiving region in which a pixel group including focal point detection pixels is arranged and a second light-receiving region in which a pixel group not including the focal point detection pixels is arranged, the imaging control method comprising performing a first control of causing the imaging element to perform imaging in a first exposure time period, and performing a second control of causing the imaging element to perform imaging by setting an exposure time period of the second light-receiving region as the first exposure time period and setting an exposure time period of the first light-receiving region as a second exposure time period.

A non-transitory computer recording medium storing a n imaging control program of still another embodiment according to the disclosed technology is an imaging control program for controlling an imaging element including a first light-receiving region in which a pixel group including focal point detection pixels is arranged and a second light-receiving region in which a pixel group not including the focal point detection pixels is arranged, the imaging control program causing a processor to perform a first control of causing the imaging element to perform imaging in a first exposure time period, and perform a second control of causing the imaging element to perform imaging by setting an exposure time period of the second light-receiving region as the first exposure time period and setting an exposure time period of the first light-receiving region as a second exposure time period.

DESCRIPTION OF THE PREFERRED EMBODIMENTS

Figure 1:
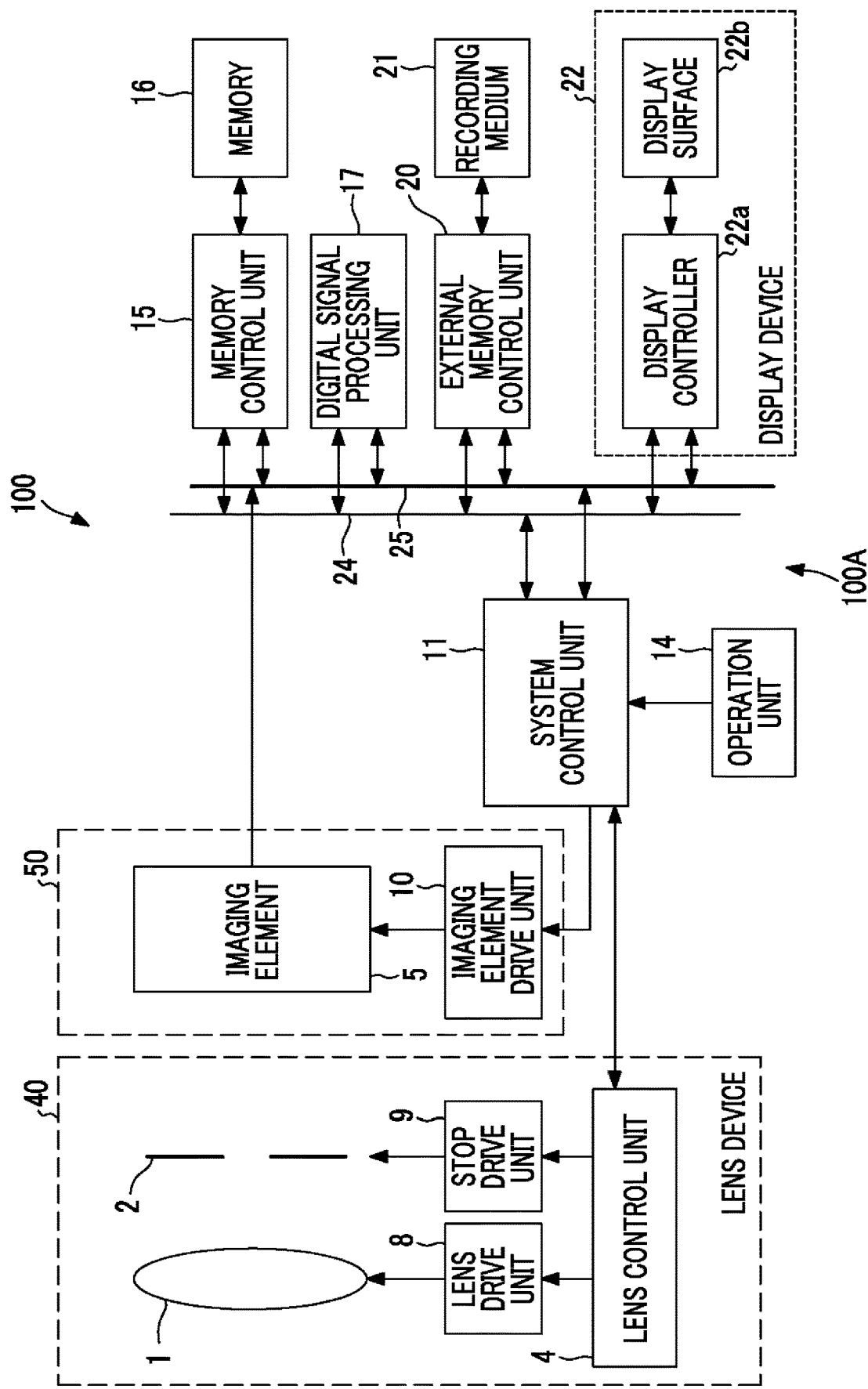
FIG. 1 is a diagram illustrating a schematic configuration of a digital camera 100 that is an imaging apparatus according to one embodiment of the present invention.

FIG. 1 is a diagram illustrating a schematic configuration of a digital camera 100 that is one embodiment of an imaging apparatus according to the present invention.

The digital camera 100 illustrated in FIG. 1 comprises a lens device 40 that includes an imaging lens 1, a stop 2, a lens control unit 4, a lens drive unit 8, and a stop drive unit 9; and a main body unit 100A. The main body unit 100A comprises an imaging unit 50, a system control unit 11, an operation unit 14, a display device 22, a memory 16 including a random access memory (RAM), a read only memory (ROM), and the like, a memory control unit 15 that controls data recording in the memory 16 and data readout from the memory 16, a digital signal processing unit 17, and an external memory control unit 20 that controls data recording on a recording medium 21 and data readout from the recording medium 21.

The lens device 40 may be attachable and detachable with respect to the main body unit 100A or may be integrated with the main body unit 100A. The imaging lens 1 includes a focus lens or the like that can be moved in an optical axis direction. This focus lens is a lens for adjusting a focal point of an imaging optical system including the imaging lens 1 and the stop 2 and is composed of a single lens or a plurality of lenses. Moving the focus lens in the optical axis direction changes a position of a principal point of the focus lens along the optical axis direction, and a focal position on a subject side is changed. A liquid lens that can change the position of the principal point in the optical axis direction under electric control may be used as the focus lens.

The lens control unit 4 of the lens device 40 is configured to be capable of communicating with the system control unit 11 of the main body unit 100A in a wired or wireless manner. In accordance with an instruction from the system control unit 11, the lens control unit 4 changes the position of the principal point of the focus lens by controlling the focus lens included in the imaging lens 1 through the lens drive unit 8 or controls an F number of the stop 2 through the stop drive unit 9.

The imaging unit 50 comprises an imaging element 5 that images a subject through the imaging optical system including the imaging lens 1 and the stop 2, and an imaging element drive unit 10 that drives the imaging element 5.

The imaging element 5 includes an imaging surface 60 (refer to FIG. 2) on which a plurality of pixels 61 are two-dimensionally arranged, converts a subject image formed on the imaging surface 60 by the imaging optical system into pixel signals by the plurality of pixels 61, and outputs the pixel signals. A complementary metal-oxide semiconductor (CMOS) image sensor is suitably used as the imaging element 5. Hereinafter, the imaging element 5 will be described as a CMOS image sensor.

The system control unit 11 that manages and controls the entire electric control system of the digital camera 100 drives the imaging element 5 through the imaging element drive unit 10 and outputs the subject image captured through the imaging optical system of the lens device 40 as an image signal.

The imaging element drive unit 10 drives the imaging element 5 by generating a drive signal based on an instruction from the system control unit 11 and supplying the drive signal to the imaging element 5. A hardware configuration of the imaging element drive unit 10 is an electric circuit configured by combining circuit elements such as semiconductor elements.

A command signal from a user is input into the system control unit 11 through the operation unit 14. The operation unit 14 includes a touch panel integrated with a display surface 22b, described later, and various buttons and the like.

The system control unit 11 manages and controls the entire digital camera 100. A hardware structure of the system control unit 11 corresponds to various processors that perform processing by executing programs including an imaging control program. The programs executed by the system control unit 11 are stored in the ROM of the memory 16.

The various processors include a central processing unit (CPU) that is a general-purpose processor performing various types of processing by executing a program, a programmable logic device (PLD) that is a processor of which a circuit configuration can be changed after manufacturing like a field programmable gate array (FPGA), or a dedicated electric circuit or the like that is a processor having a circuit configuration dedicatedly designed to execute a specific type of processing like an application specific integrated circuit (ASIC). More specifically, a structure of the various processors is an electric circuit in which circuit elements such as semiconductor elements are combined.

The system control unit 11 may be configured with one of the various processors or may be configured with a combination of two or more processors of the same type or different types (for example, a combination of a plurality of FPGAs or a combination of a CPU and an FPGA).

The display device 22 comprises the display surface 22b configured with an organic electroluminescence (EL) panel, a liquid crystal panel, or the like and a display controller 22a that controls display on the display surface 22b.

The memory control unit 15, the digital signal processing unit 17, the external memory control unit 20, and the display controller 22a are connected to each other through a control bus 24 and a data bus 25 and are controlled by instructions from the system control unit 11.

Figure 2:
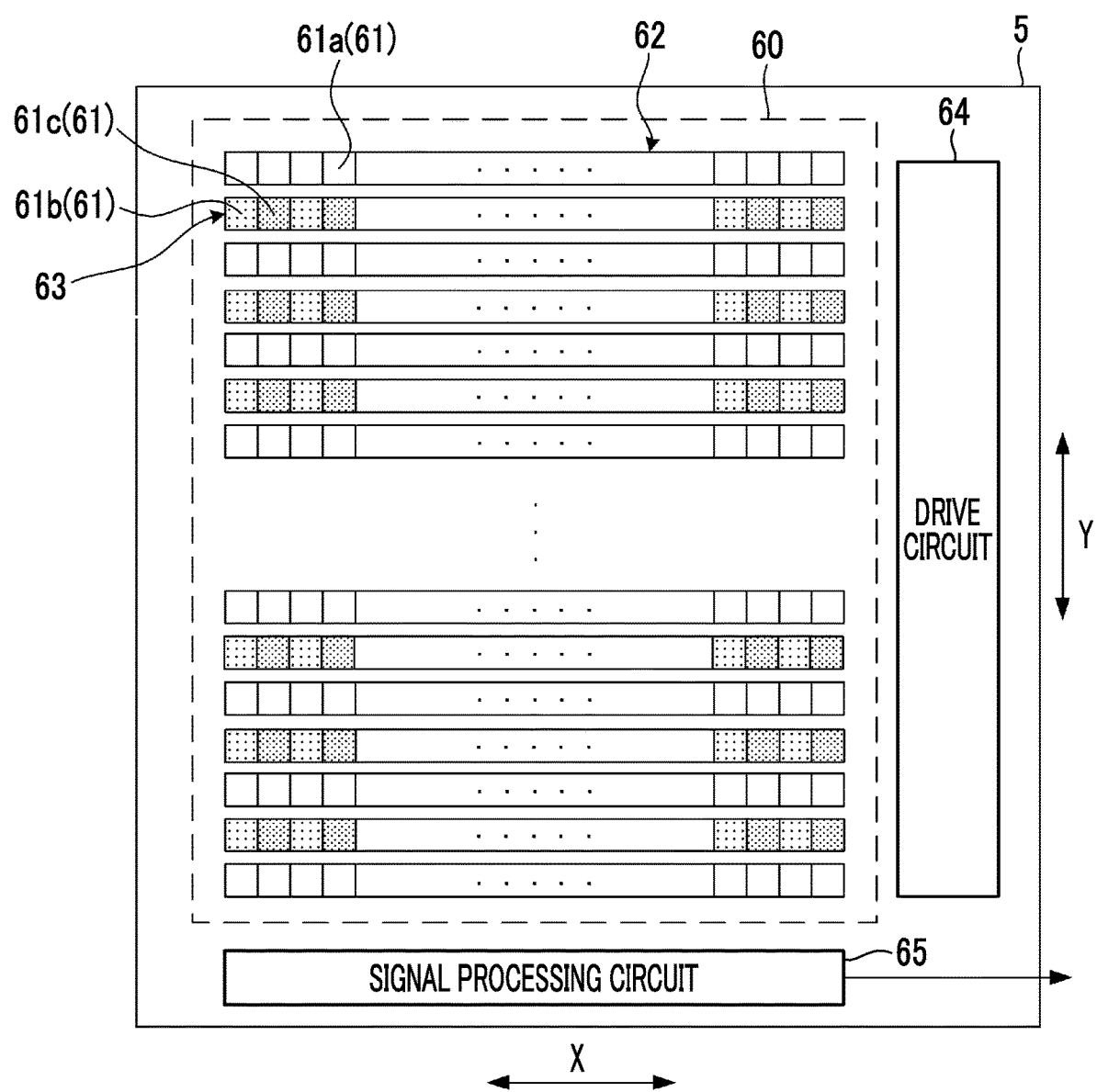
FIG. 2 is a schematic plan view illustrating a schematic configuration of an imaging element 5 illustrated in FIG. 1.

FIG. 2 is a schematic plan view illustrating a schematic configuration of the imaging element 5 illustrated in FIG. 1. The imaging element 5 includes the imaging surface 60 on which the plurality of pixels 61 are two-dimensionally arranged in a row direction X and a column direction Y orthogonal to the row direction X. The plurality of pixels 61 include a focal point detection pixel 61b for detecting a signal corresponding to a quantity of received light by receiving one of a pair of luminous fluxes passing through two different parts arranged in the row direction X in a pupil region of the imaging optical system, a focal point detection pixel 61c for detecting a signal corresponding to a quantity of received light by receiving the other of the pair of luminous fluxes, and a normal pixel 61a for detecting a signal corresponding to a quantity of received light by receiving both of the pair of luminous fluxes.

In the example in FIG. 2, a pixel line 62 obtained by arranging a plurality of the normal pixels 61a in the row direction X and a pixel line 63 obtained by alternately arranging the focal point detection pixel 61b and the focal point detection pixel 61c in the row direction X are alternately arranged in the column direction Y on the imaging surface 60. The pixel line 63 may include a plurality of pairs of the focal point detection pixel 61b and the focal point detection pixel 61c and may also include the normal pixel 61a in addition to these pairs. Hereinafter, the pixel line 62 and the pixel line 63 will be simply referred to as a pixel line unless otherwise distinguished. The imaging element 5 further comprises a drive circuit 64 that drives the pixels 61 arranged on the imaging surface 60, and a signal processing circuit 65 that processes a pixel signal read out to a signal line from each pixel 61 of each pixel line arranged on the imaging surface 60.

Hereinafter, in FIG. 2, an end part of the imaging surface 60 on one end side (an upper side in FIG. 2) of the column direction Y will be referred to as an upper end, and an end part of the imaging surface 60 on the other end side (a lower side in FIG. 2) of the column direction Y will be referred to as a lower end. A region in which each pixel line 63 is arranged in the imaging surface 60 constitutes a first light-receiving region. A region in which each pixel line 62 is arranged in the imaging surface 60 constitutes a second light-receiving region.

The drive circuit 64 performs resetting (discharge of charges accumulated in a photoelectric conversion element) of each pixel 61 included in each pixel line, reading out of a pixel signal corresponding to the charges accumulated in the photoelectric conversion element of each pixel 61 to a signal line, and the like by independently driving each pixel line based on a signal from the imaging element drive unit 10.

The signal processing circuit 65 performs correlative double sampling processing on the pixel signal read out to the signal line from each pixel 61 of the pixel line, converts the pixel signal after the correlative double sampling processing into a digital signal, and outputs the digital signal to the data bus 25 (refer to FIG. 1). The signal processing circuit 65 is controlled by the imaging element drive unit 10.

The digital signal processing unit 17 generates captured image data by performing signal processing such as demosaicing and gamma-correction processing on a pixel signal group output to the data bus 25 from the imaging element 5.

The digital camera 100 is equipped with a continuous shooting mode in which a plurality of pieces of captured image data are continuously generated and recorded on the recording medium 21 in accordance with one imaging instruction.

In the continuous shooting mode, the system control unit 11 drives the imaging element 5 to image the subject by the imaging element drive unit 10 based on a rolling shutter system. Driving based on the rolling shutter system includes rolling reset driving and rolling readout driving. The rolling reset driving is driving of sequentially performing processing of starting exposure of each pixel 61 by resetting each pixel 61 of the pixel line while changing the pixel line. The rolling readout driving is driving of sequentially performing processing of reading out a signal from each pixel 61 of an exposed pixel line and finishing the exposure of the pixel line while changing the pixel line.

In the continuous shooting mode, in a case where the imaging instruction is received, the system control unit 11 continuously performs recording of the captured image data, displaying of a live view image on the display surface 22b, and a recording imaging control. The recording imaging control is the control for outputting a pixel signal to be used for a focal point detection from the imaging element 5. In addition, the system control unit 11 performs a display imaging control at least once between each of a plurality of the recording imaging controls. The display imaging control is a control for outputting a pixel signal to be used for the display of the live view image on the display surface 22b and the focal point detection from the imaging element 5. The recording imaging control constitutes a first control, and the display imaging control constitutes a second control. That is, the system control unit 11 performs the recording imaging control (the first control) a plurality of times. The plurality of the recording imaging controls includes a preceding recording imaging control (a preceding first control) and a subsequent recording imaging control (a subsequent first control). The subsequent recording imaging control is the recording imaging control performed next to the preceding first control. In other words, the preceding recording imaging control is the recording imaging control performed prior to the subsequent first control. For example, in a case where the recording imaging controls are performs three times, the first recording imaging control is the preceding recording imaging control with respect to the second recording imaging control, and the second recording imaging control is the subsequent recording imaging control with respect to the first recording imaging control. Furthermore, the second recording imaging control is the preceding recording imaging control with respect to the third recording imaging control, and the third recording imaging control is the subsequent recording imaging control with respect to the second recording imaging control.

The focal point detection refers to processing of performing correlation calculation between a first pixel signal group output from each focal point detection pixel 61b and a second pixel signal group output from each focal point detection pixel 61c and deriving a drive amount of the focus lens necessary for focusing on a target subject based on a result of the correlation calculation. Here, the focal point detection pixel 61b and the focal point detection pixel 61c used for the correlation calculation are pixels included in the same pixel line 63.

The correlation calculation is processing of calculating an area S[d] surrounded by two data waveforms of a data waveform consisting of the first pixel signal group and a data waveform consisting of the second pixel signal group. Specifically, the correlation calculation is the processing of calculating the area S[d] in a case where the two data waveforms are shifted while changing the shift amount d by a plurality of values.

Figure 3:
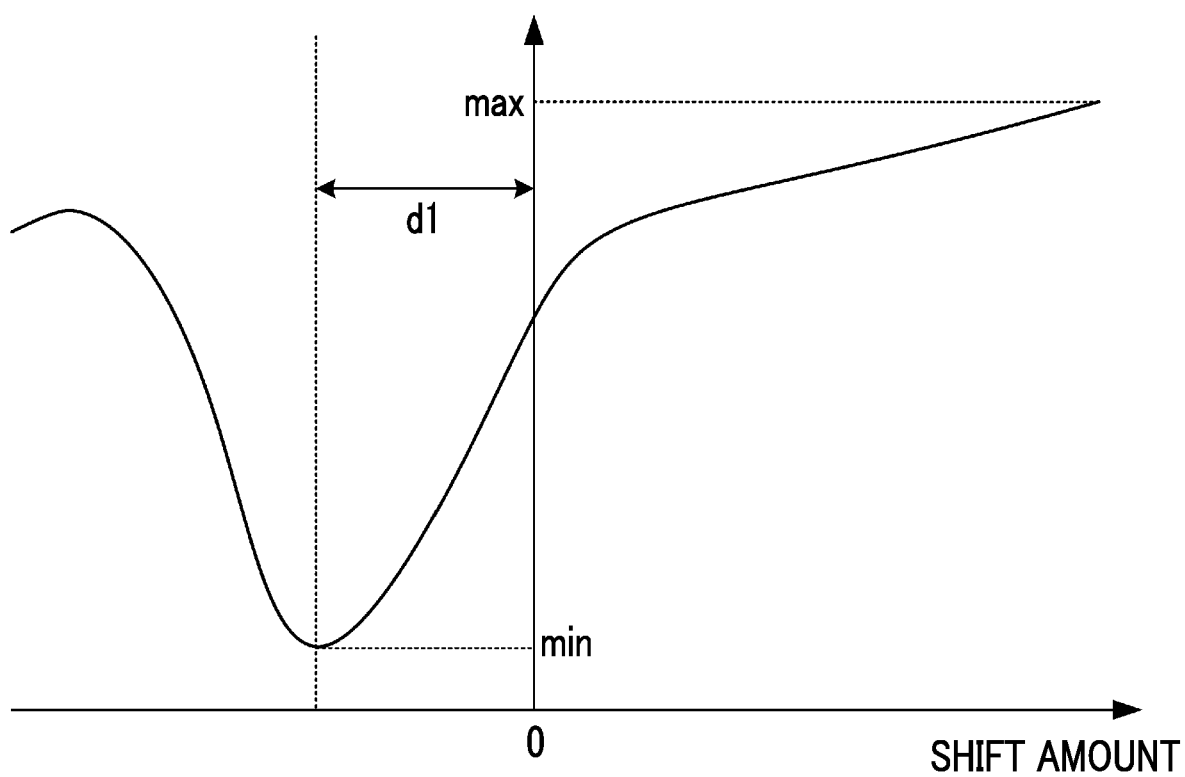
FIG. 3 is a diagram illustrating an example of a curve showing a result of a correlation calculation.

FIG. 3 is a diagram illustrating an example of a curve showing a result of the correlation calculation. A horizontal axis in FIG. 3 denotes the shift amount d, and a vertical axis in FIG. 3 denotes the area S[d]. The drive amount of the focus lens can be derived by deriving a defocus amount based on the shift amount d=d1 in a case where the area S[d] is a minimum value min. A maximum value max of the area S[d] depends on the target subject. For example, in a case of a subject having high contrast bright condition), the maximum value max is increased. In a case of a subject having low contrast dark condition), the maximum value max is decreased. In a case where a difference between the maximum value max and the minimum value min is decreased, it is difficult to decide the minimum value min. Thus, a magnitude of the maximum value max affects derivation accuracy (in other words, accuracy of the focal point detection) of the drive amount of the focus lens.

In the recording imaging control, the system control unit 11 causes the imaging element 5 to perform imaging by setting exposure time periods of the pixel line 62 and the pixel line 63 to a first exposure time period (exposure time period EX1 described later). The first exposure time period is a value decided based on exposure set by the user or exposure automatically set based on brightness and the like of the subject.

In the display imaging control, the system control unit 11 causes the imaging element 5 to perform imaging by setting the exposure time period of the pixel line 62 to the first exposure time period and setting the exposure time period of the pixel line 63 to a second exposure time period (exposure time period EX2 described later). The second exposure time period is a value decided by an exposure condition under which detection accuracy of the minimum value min can be sufficiently secured. The second exposure time period may be the same value as the first exposure time period or may be a value greater than the first exposure time period. However, since quantities of received light of the focal point detection pixel 61b and the focal point detection pixel 61c are smaller than that of the normal pixel 61a, the second exposure time period is generally longer than the first exposure time period.

Figure 4:
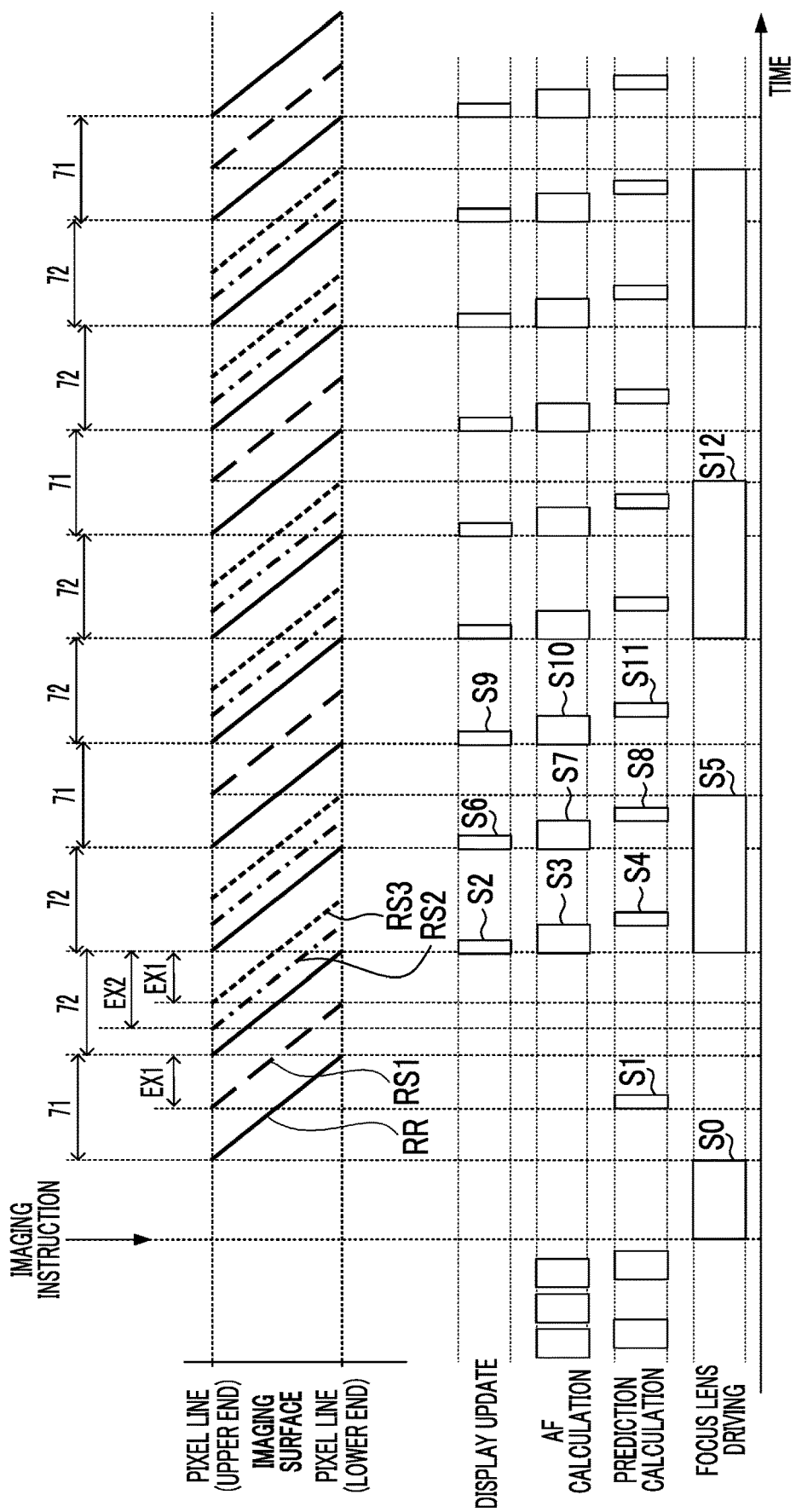
FIG. 4 is a diagram illustrating an example of a timing chart for describing an operation of the digital camera 100 illustrated in FIG. 1 at a time of a continuous shooting mode.

FIG. 4 is a diagram illustrating an example of a timing chart for describing an operation of the digital camera 100 illustrated in FIG. 1 at a time of the continuous shooting mode.

A drive timing of each pixel line of the imaging element 5 is illustrated in an upper part of FIG. 4. In the upper part of FIG. 4, a vertical axis denotes a position of the pixel line in the column direction Y. Diagonal line RR (only a part thereof is designated by a reference sign) of a solid line illustrated in the drive timing illustrates a timing at which the exposure of each pixel line is finished by the rolling readout driving. Diagonal line RS1 (only a part thereof is designated by a reference sign) of a broken line illustrated in the drive timing illustrates a timing at which the resetting (start of exposure) of each pixel line is performed. Diagonal line RS2 (only a part thereof is designated by a reference sign) of a dot-dashed line illustrated in the drive timing illustrates a timing at which the resetting (start of exposure) of each pixel line 63 is performed. Diagonal line RS3 (only a part thereof is designated by a reference sign) of a broken line illustrated in the drive timing illustrates a timing at which the resetting (start of exposure) of each pixel line 62 is performed. A period surrounded by diagonal line RR and adjacent diagonal line RR on a right side constitutes one frame period as a control period. In FIG. 4, a frame period in which the recording imaging control is executed is illustrated as a frame period 71, and a frame period in which the display imaging control is executed is illustrated as a frame period 72. In the example in FIG. 4, in a case where the imaging instruction is received, the system control unit 11 repeatedly executes processing of performing the recording imaging control (frame period 71), the display imaging control (frame period 72), and the display imaging control (frame period 72) in this order.

In the frame period 71 in which the recording imaging control is performed, a period surrounded by diagonal line RS1 and adjacent diagonal line RR on a right side illustrates the exposure time period EX1 of all pixel lines. A pixel signal group output from each pixel 61 of the imaging element 5 by imaging in the exposure time period EX1 in the frame period 71 is used for generation of the captured image data, generation of the live view image, and the focal point detection.

In the frame period 72 in which the display imaging control is performed, a period surrounded by diagonal line RS2 and adjacent diagonal line RR on a right side illustrates the exposure time period EX2 of the pixel line 63, and a period surrounded by diagonal line RS3 and adjacent diagonal line RR on a right side illustrates the exposure time period EX1 of the pixel line 62. As illustrated in FIG. 4, the exposure time period EX2 is longer than the exposure time period EX1. A pixel signal group output from each pixel line 63 by imaging in the exposure time period EX2 in the frame period 72 is used for the focal point detection. A pixel signal group output from each pixel line 62 by imaging in the exposure time period EX1 in the frame period 72 is used for the generation of the live view image.

A rectangle illustrated in item "display update" in FIG. 4 illustrates a period in which the live view image displayed on the display surface 22b is updated. A rectangle illustrated in item "auto focus (AF) calculation" in FIG. 4 illustrates a period in which the focal point detection is performed. A rectangle illustrated in item "prediction calculation" in FIG. 4 illustrates a period in which processing of predicting a subsequent drive amount of the focus lens at an exposure start timing of the recording imaging control based on the drive amount of the focus lens obtained by the focal point detection performed in the past up to the present is performed. A rectangle illustrated in item "focus lens driving" in FIG. 4 illustrates a period in which the focus lens is driven based on a result of the prediction calculation.

The system control unit 11 continues executing the recording imaging control (the exposure time period may not be EX1) until receiving the imaging instruction and repeats the display of the live view image, the focal point detection, and the prediction calculation based on the pixel signal group obtained by executing the recording imaging control. In a case where the imaging instruction is received, the system control unit 11 performs a focal point control by driving the focus lens in accordance with the drive amount at a time of a start of the first frame period 71 predicted at a time of reception of the imaging instruction (step S0 in FIG. 4).

After the imaging instruction is received, the system control unit 11 executes the recording imaging control in the first frame period 71. In a case where the recording imaging control is finished, the system control unit 11 subsequently performs the display imaging control twice. In addition, the system control unit 11 generates the live view image based on the pixel signal group of the pixel line 62 obtained by the recording imaging control and updates display by displaying the live view image on the display surface 22b (step S2 in FIG. 4). In addition, the system control unit 11 executes the focal point detection based on the pixel signal group of the pixel line 63 obtained by the recording imaging control (step S3 in FIG. 4) and predicts the drive amount of the focus lens at a time of the start of the exposure in the second frame period 71 based on the drive amount of the focus lens obtained by executing the focal point detection and the drive amount of the focus lens obtained by the focal point detection performed in the past (step S4 in FIG. 4).

In a case where the driving of the focus lens by the drive amount predicted in step S4 can be completed until the start of the exposure in the second frame period 71, the system control unit 11 performs a focusing control by driving the focus lens in accordance with the predicted drive amount until the start of the exposure in the second frame period 71. FIG. 4 illustrates a case where the driving of the focus lens by the drive amount predicted in step S4 cannot be completed until the start of the exposure in the second frame period 71. In such a case, in a case where the first frame period 71 is finished, the system control unit 11 drives the focus lens in accordance with the drive amount at the time of the start of the exposure in the second frame period 71 predicted in step S1 during the first frame period 71 (step S5 in FIG. 4).

In a case where the first frame period 72 after the imaging instruction is finished, the system control unit 11 generates the live view image based on the pixel signal group of the pixel line 62 obtained by imaging in the frame period 72 and updates display by displaying the live view image on the display surface 22b (step S6 in FIG. 4). In addition, in a case where the first frame period 72 is finished, the system control unit 11 executes the focal point detection based on the pixel signal group of the pixel line 63 obtained by imaging in the frame period 72 (step S7 in FIG. 4) and predicts the drive amount of the focus lens at the time of the start of the exposure in the third frame period 71 based on the drive amount of the focus lens obtained by executing the focal point detection and the drive amount (at least the drive amount obtained in step S3) of the focus lens obtained by the focal point detection performed in the past (step S8 in FIG. 4).

In a case where the second frame period 72 after the imaging instruction is finished, the system control unit 11 generates the live view image based on the pixel signal group of the pixel line 62 obtained by imaging in the frame period 72 and updates display by displaying the live view image on the display surface 22b (step S9 in FIG. 4). In addition, in a case where the second frame period 72 is finished, the system control unit 11 executes the focal point detection based on the pixel signal group of the pixel line 63 obtained by imaging in the frame period 72 (step S10 in FIG. 4) and predicts the drive amount of the focus lens at the start of the exposure in the third frame period 71 based on the drive amount of the focus lens obtained by executing the focal point detection and the drive amount (including the drive amount obtained in step S3 and step S7) of the focus lens obtained by the focal point detection performed in the past (step S11 in FIG. 4). The system control unit 11 drives the focus lens in accordance with the drive amount predicted in step S11 (step S12 in FIG. 4). Then, the same operation as step S2 to step S12 is repeated.

As described above, according to the digital camera 100, since imaging is performed with exposure appropriate for recording in the frame period 71, the captured image data of high quality can be recorded. In addition, in the frame period 72, imaging is performed in the same exposure time period EX1 as the frame period 71 for the pixel line 62, and the live view image is updated based on the pixel signal group output from the pixel line 62. Thus, constant brightness of the live view image can be achieved, and quality of the live view image during continuous shooting can be improved. In addition, in the frame period 72, imaging is performed in the exposure time period EX2 appropriate for the focal point detection for the pixel line 63, and the focal point detection is performed based on the pixel signal group output from the pixel line 63. Thus, accuracy of the focusing control using a result of the focal point detection can be improved.

First Modification Example of Operation of Digital Camera 100

Figure 5:
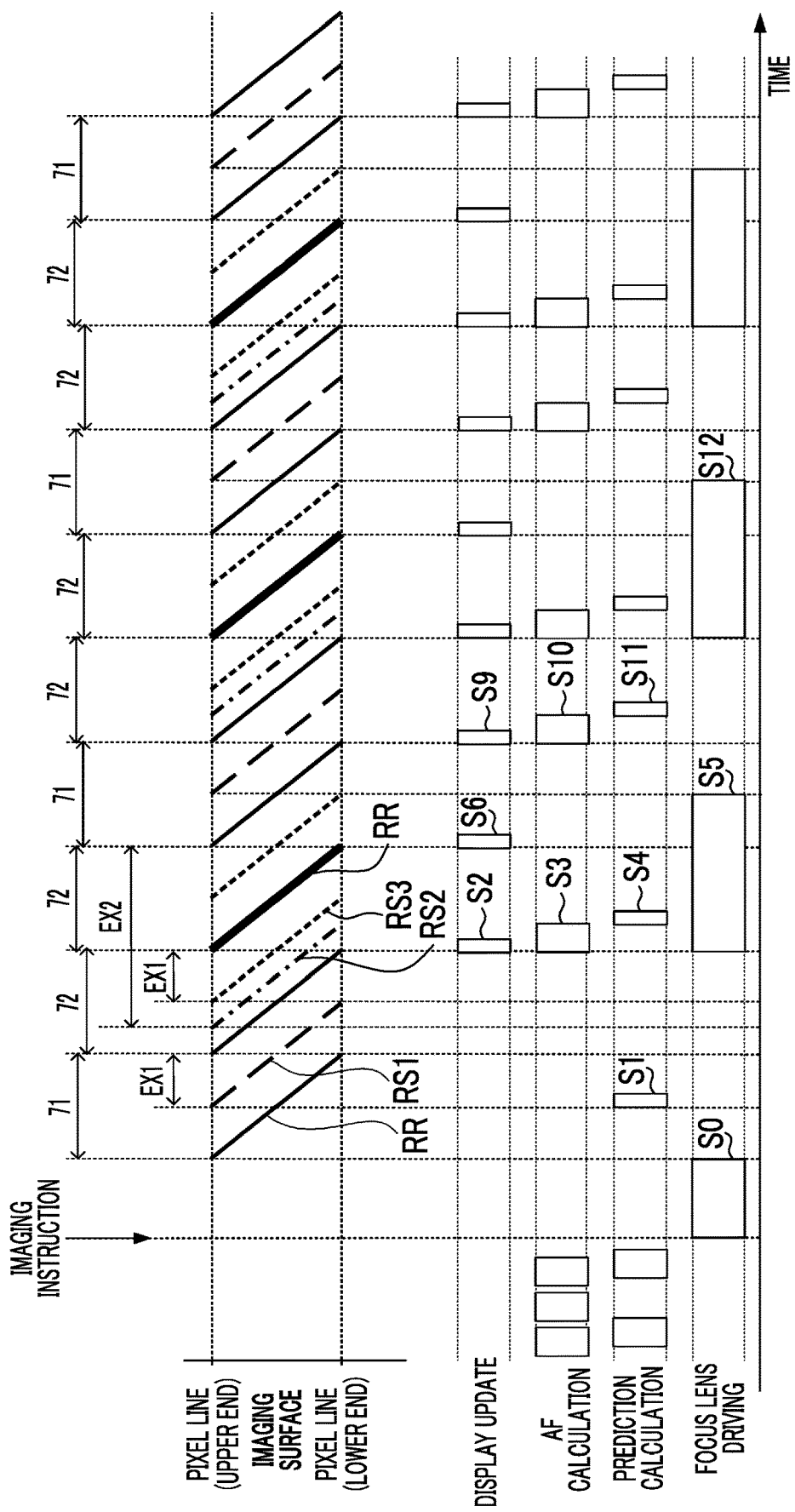
FIG. 5 is a timing chart for describing a first modification example of the operation of the digital camera 100.

FIG. 5 is a timing chart for describing a first modification example of the operation of the digital camera 100. In the first modification example, an operation example in a case of setting the exposure time period EX2 set in the frame period 72 to be longer than an upper limit value (hereinafter, referred to as a longest exposure time period) per frame period is illustrated.

In FIG. 5, diagonal line RR that constitutes a boundary between the frame period 72 and the subsequent frame period 72 among diagonal lines RR illustrated in FIG. 4 is changed to a thick solid line. This thick diagonal line RR illustrates a timing at which the rolling readout driving of reading out the pixel signal from only the pixel line 62 and not reading out the pixel signal from the pixel line 63 is performed. In addition, compared to FIG. 4, FIG. 5 omits the reading out (that is, diagonal line RS2 immediately after thick diagonal line RR) of the pixel signal from the pixel line 63 in the third, sixth, and ninth frame periods 72 out of all frame periods 71, 72.

In the operation of the modification example illustrated in FIG. 5, the reading out of the pixel signal from the pixel line 63 is not performed at an end timing of the frame period 72 immediately after the frame period 71. Thus, step S7 and step S8 illustrated in FIG. 4 are removed. The reading out of the pixel signal from the pixel line 63 is performed at an end timing of the second frame period after the frame period 71. In the modification example in FIG. 5, the exposure time period EX2 is set to be longer than the longest exposure time period by continuing the exposure of the pixel line 63 over two frame periods.

According to the first modification example, since the exposure time period EX2 can be set to be longer than the longest exposure time period, the focusing control can be performed with high accuracy even for a dark subject. In addition, since the reading out of the pixel signal from the pixel line 62 is performed for each frame period, update frequency of the live view image is not decreased even in a case where the exposure time period EX2 is increased. Consequently, the quality of the live view image during the continuous shooting can be increased.

Second Modification Example of Operation of Digital Camera 100

Figure 6:
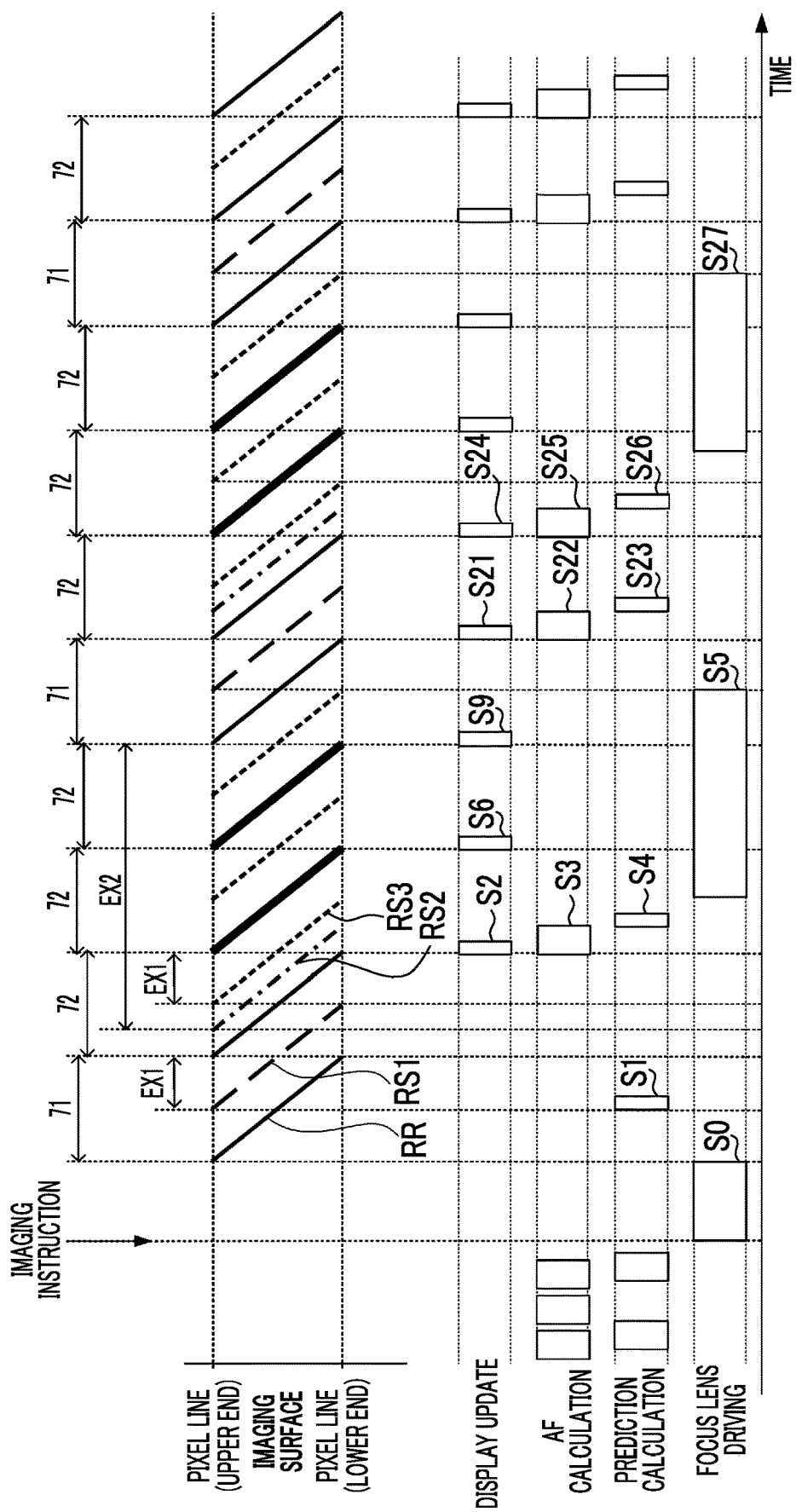
FIG. 6 is a timing chart for describing a second modification example of the operation of the digital camera 100.

FIG. 6 is a timing chart for describing a second modification example of the operation of the digital camera 100. In the second modification example, an operation example in a case of further increasing the exposure time period EX2 set in the frame period 72 from the example in FIG. 5 is illustrated.

FIG. 6 is significantly different from FIG. 4 in that three frame periods 72 are present between the frame period 71 and the subsequent frame period 71. In addition, in FIG. 6, step S5 is changed to processing of driving the focus lens in accordance with the drive amount predicted in step S4. In addition, in FIG. 6, diagonal line RR constituting boundaries among the three frame periods 72 is a thick line. This thick diagonal line RR illustrates a timing at which the rolling readout driving of reading out the pixel signal from only the pixel line 62 and not reading out the pixel signal from the pixel line 63 is performed. In addition, in FIG. 6, the rolling resetting driving illustrated by diagonal line RS2 is performed in only the first frame period 72 of the three frame periods 72, and the rolling resetting driving illustrated by diagonal line RS2 is not performed in the frame periods 72 other than the first frame period 72 of the three frame periods 72. That is, the exposure of the pixel line 63 continues over three frame periods 72 after the frame period 71.

In the operation of the modification example illustrated in FIG. 6, the reading out of the pixel signal from the pixel line 63 is not performed at an end timing of two frame periods 72 immediately after the frame period 71. Thus, step S7, step S8, step S10, and step S11 illustrated in FIG. 4 are removed. The reading out of the pixel signal from the pixel line 62 and the pixel line 63 is performed at an end timing of the third frame period after the frame period 71. The update (step S21) of the live view image based on this pixel signal, the focal point detection (step S22) based on this pixel signal, and the prediction (step S23) of the drive amount of the focus lens at the time of the start of the exposure in the third frame period 71 based on this focal point detection result and a focal point detection result in the past are performed.

Then, in a case where the second frame period 71 is finished, step S24 corresponding to step S2, step S25 corresponding to step S3, and step S26 corresponding to step S4 are performed. The system control unit 11 drives the focus lens in accordance with the drive amount predicted in step S26 (step S27). Then, the same processing as step S6, step S9, step S21, step S22, and step S23 is repeated.

In the modification example in FIG. 6, the exposure time period EX2 is set to be longer than the longest exposure time period by continuing the exposure of the pixel line 63 over three frame periods. According to this modification example, since the exposure time period EX2 can be further set to be longer than the example in FIG. 5, the focusing control for a darker subject can be performed with high accuracy. In addition, since the reading out of the pixel signal from the pixel line 62 is performed for each frame period, the update frequency of the live view image is not decreased even in a case where the exposure time period EX2 is increased. Consequently, the quality of the live view image during the continuous shooting can be increased.

Preferred Example of Digital Camera 100

Here, a preferred example of a method of predicting the drive amount of the focus lens will be described. For example, in step S11 in FIG. 4, the system control unit 11 predicts the drive amount of the focus lens based on the drive amount derived in step S3, the drive amount derived in step S7, and the drive amount derived in step S10. The system control unit 11 obtains a linear function showing a change in time of the drive amount from these three drive amounts using weighted least squares and derives the drive amount at a timing of the prediction from this linear function as a prediction value.

The system control unit 11 determines a weighting coefficient that is set for each of the three drive amounts using the weighted least squares. Specifically, the system control unit 11 sets the weighting coefficient to be a relatively large value for a first drive amount (in the example in FIG. 4, the drive amount obtained in each of step S7 and step S10) derived based on the pixel signal obtained by imaging in the exposure time period appropriate for the focal point detection. On the other hand, the system control unit 11 sets the weighting coefficient to be a smaller value than the weighting coefficient of the first drive amount for a second drive amount (in the example in FIG. 4, the drive amount obtained in step S3) derived based on the pixel signal obtained by imaging in the exposure time period appropriate for recording. Doing so can increase prediction accuracy of the drive amount even in a case where the exposure of imaging performed in the frame period 71 is not appropriate for the focal point detection.

The weighting coefficient of the second drive amount may be variable instead of being a fixed value. For example, the system control unit 11 changes the weighting coefficient based on an imaging condition (imaging sensitivity or a difference in exposure with respect to the exposure appropriate for the focal point detection) of imaging performed in the frame period 71. The system control unit 11 sets the weighting coefficient of the second drive amount to be a large value in a state where the accuracy of the focal point detection can be secured with the imaging condition, and sets the weighting coefficient of the second drive amount to be a small value in a state where the accuracy of the focal point detection cannot be secured with the imaging condition. For example, in a state where the imaging sensitivity is high, the accuracy of the focal point detection tends to be decreased because noise is increased. Therefore, the system control unit 11 sets the weighting coefficient of the first drive amount to be the same as the weighting coefficient of the second drive amount in a case where the imaging sensitivity is less than a threshold value, and decreases the weighting coefficient of the first drive amount in inverse proportion to a magnitude of the imaging sensitivity in a case where the imaging sensitivity is greater than or equal to the threshold value. In addition, the system control unit 11 sets the weighting coefficient of the first drive amount to be the same value as the weighting coefficient of the second drive amount in a case where the difference in exposure is less than a threshold value, and decreases the weighting coefficient of the first drive amount in inverse proportion to a magnitude of the difference in exposure in a case where the difference in exposure is greater than or equal to the threshold value. Doing so can increase the prediction accuracy of the drive amount.

Another Preferred Example of Digital Camera 100

In the first modification example and the second modification example, while the exposure time period EX2 can be set to be longer than the longest exposure time period, frequency of the focal point detection is decreased, or a frame rate of the continuous shooting is decreased, compared to a case where the exposure time period EX2 is less than or equal to the longest exposure time period. Thus, it is preferable to increase the prediction accuracy of the drive amount of the focus lens while maintaining the exposure time period EX2 to be less than or equal to the longest exposure time period.

For example, in a case where appropriate exposure (exposure appropriate for the focal point detection) of the pixel line 63 that is decided in accordance with brightness of the target subject is not obtained even by setting the exposure time period EX2 to the longest exposure time period, the system control unit 11 increases the imaging sensitivity of the imaging element 5 in imaging in the frame period 72.

Figure 7:
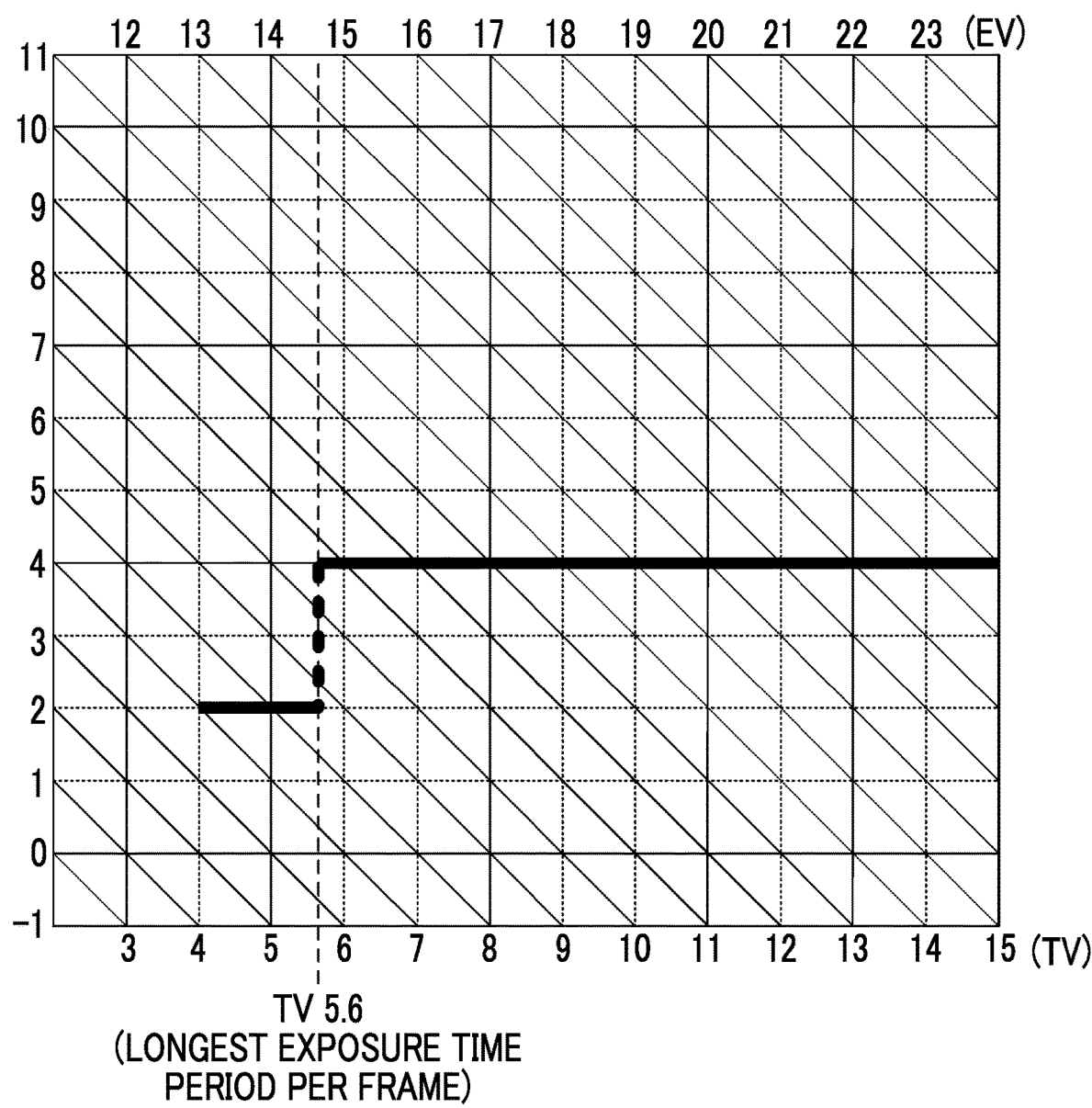
FIG. 7 is a diagram illustrating an example of a program line diagram used in exposing a pixel line 63.

FIG. 7 illustrates an example of a program line diagram in which a relationship between an exposure value (EV) and a time value (TV) corresponding to the exposure time period in a case where the imaging sensitivity and the F number are predetermined values is defined. In FIG. 7, a program line diagram in a case where the longest exposure time period is 5.6 TV is illustrated. As illustrated in FIG. 7, the appropriate exposure of the pixel line 63 is implemented by adjusting the TV (exposure time period), in a case where the EV is within a range from 23 EV to near 8 EV. In a case where the EV is less than or equal to 7.5 EV, the appropriate exposure of the pixel line 63 is implemented by changing the imaging sensitivity between the predetermined value and a predetermined upper limit value while maintaining 5.6 TV. A thick broken line in FIG. 7 illustrates a change in the program line diagram by increasing the imaging sensitivity. In a case where the EV is further decreased below 5.5 EV, the appropriate exposure of the pixel line 63 cannot be implemented even by setting the imaging sensitivity to the predetermined upper limit value unless the TV is decreased. Thus, the appropriate exposure of the pixel line 63 is secured by changing the TV to a smaller value than 5.6 TV (a thick solid line on a left side in FIG. 7). That is, changing the TV to a smaller value than 5.6 TV means switching from the operation (an operation of finishing the exposure of the pixel line 63 within one frame period 72) illustrated in FIG. 4 to the operation (an operation of continuing the exposure of the pixel line 63 over a plurality of frame periods 72) illustrated in FIG. 5 or FIG. 6.

In a case where the appropriate exposure for the focal point detection cannot be implemented even by setting the exposure time period EX2 to the longest exposure time period, a possibility of the exposure time period EX2 exceeding the longest exposure time period can be reduced by increasing the imaging sensitivity within a range in which the appropriate exposure can be implemented without extending the longest exposure time period. Accordingly, it is possible to secure the accuracy of the focusing control while preventing a decrease in the frequency of the focal point detection and a decrease in the frame rate of the continuous shooting as much as possible.

In the above description, in a case where the appropriate exposure cannot be implemented even by increasing the imaging sensitivity to the predetermined upper limit value, the exposure time period EX2 is changed to a larger value than the longest exposure time period. However, even in a case where the appropriate exposure cannot be implemented by increasing the imaging sensitivity to the predetermined upper limit value, the accuracy of the focal point detection may be secured depending on a situation. For example, even in imaging performed based on the pixel line 63 in a state where the appropriate exposure cannot be implemented, in a case where the maximum value max of the curve that is illustrated in FIG. 3 and is obtained by this imaging is large, the minimum value min can be decided with high accuracy, and the accuracy of the focal point detection can be secured.

Therefore, in a case where the appropriate exposure of the pixel line 63 is not obtained even by setting the exposure time period EX2 to the longest exposure time period and setting the imaging sensitivity to the predetermined upper limit value, the system control unit 11 performs the display imaging control by setting the exposure time period EX2 to the longest exposure time period and setting the imaging sensitivity to the predetermined upper limit value as long as information based on the pixel signal output from the pixel line 63 in immediately previous imaging (imaging in the frame period 71) satisfies a predetermined condition. Examples of the predetermined condition include a condition that a ratio (max/min) of the maximum value max and the minimum value min of the curve showing the result of the correlation calculation based on the pixel signal output from the pixel line 63 exceeds a threshold value, or a condition that a difference (max−min) between the maximum value max and the minimum value min exceeds a threshold value.

Figure 8:
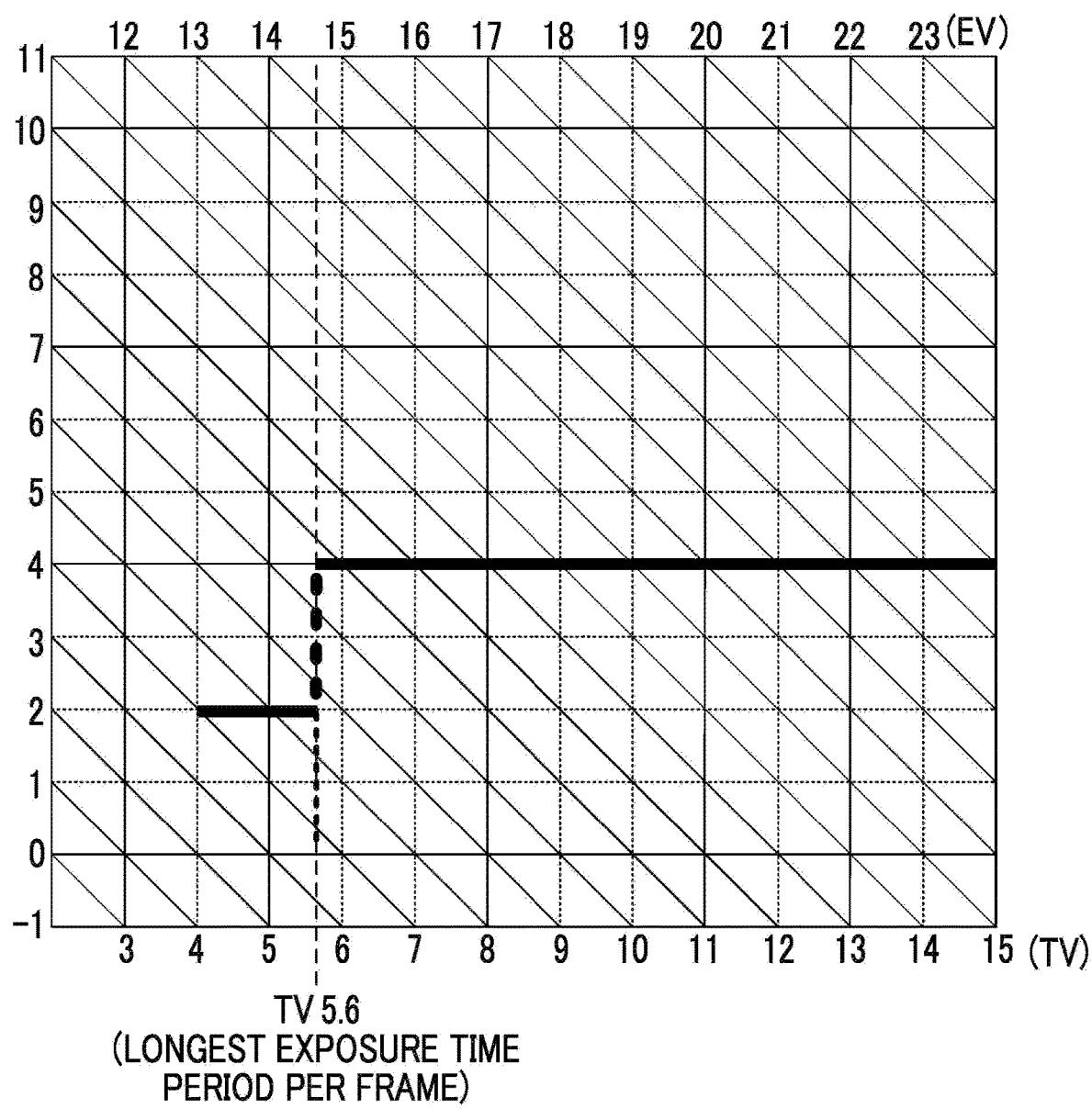
FIG. 8 is a diagram illustrating an example of the program line diagram used in exposing the pixel line 63.

FIG. 8 illustrates an example of a program line diagram in which a relationship between the exposure value and the TV in a case where the imaging sensitivity and the F number are predetermined values is defined. In FIG. 8, a program line diagram in a case where the longest exposure time period is 5.6 TV is illustrated. As illustrated in FIG. 8, the appropriate exposure of the pixel line 63 is implemented by adjusting the TV, in a case where the EV is within a range from 23 EV to near 8 EV. In a case where the EV is less than or equal to 7.5 EV, the appropriate exposure of the pixel line 63 is implemented by changing the imaging sensitivity between the predetermined value and the predetermined upper limit value while maintaining 5.6 TV (a thick broken line in FIG. 8). In a case where the EV is further decreased below 5.5 EV and a predetermined condition is satisfied, the display imaging control is performed in a state where the imaging sensitivity is set to the predetermined upper limit value and the exposure time period EX2 is set to the longest exposure time period (a thin broken line in FIG. 8). That is, the display imaging control is performed in a state of underexposure in which the exposure is lower than the appropriate exposure. On the other hand, in a case where the EV is below 5.5 EV and the predetermined condition is not satisfied, the accuracy of the focal point detection cannot be secured unless the TV is decreased, and the appropriate exposure cannot be implemented. Thus, the appropriate exposure is secured by changing the TV to a smaller value than 5.6 TV (a thick solid line on a left side in FIG. 8).

In a case where it is difficult to secure the appropriate exposure even by setting the exposure time period EX2 to the longest exposure time period and increasing the imaging sensitivity to the predetermined upper limit value, the possibility of the exposure time period EX2 exceeding the longest exposure time period can be reduced by performing the display imaging control in the underexposure as long as the predetermined condition is satisfied. Accordingly, it is possible to secure the accuracy of the focusing control while preventing a decrease in the frequency of the focal point detection and a decrease in the frame rate of the continuous shooting as much as possible.

Next, a configuration of a smartphone that is another embodiment of the imaging apparatus according to the present invention will be described.

Figure 9:
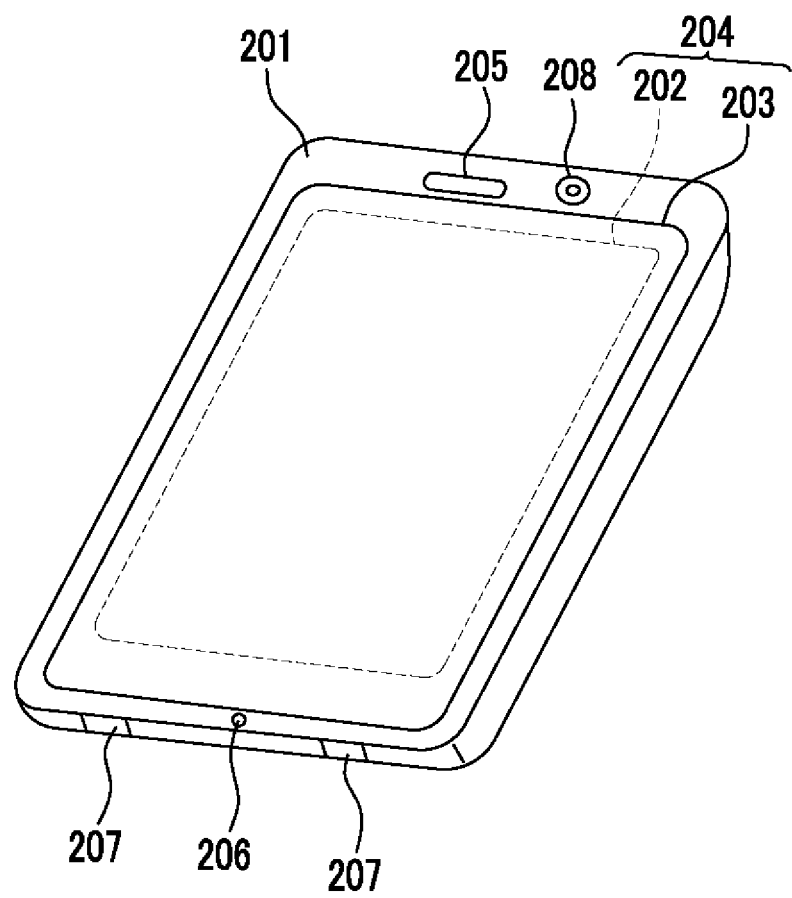
FIG. 9 illustrates an exterior of a smartphone 200.

FIG. 9 illustrates an exterior of a smartphone 200. The smartphone 200 illustrated in FIG. 9 includes a casing 201 having a flat plate shape and comprises a display and input unit 204 in which a display panel 202 as a display unit and an operation panel 203 as an input unit are integrated on one surface of the casing 201.

The casing 201 comprises a speaker 205, a microphone 206, an operation unit 207, and a camera unit 208. The configuration of the casing 201 is not for limitation and may employ, for example, a configuration in which the display unit and the input unit are independently disposed, or a configuration that has a folded structure or a sliding mechanism.

Figure 10:
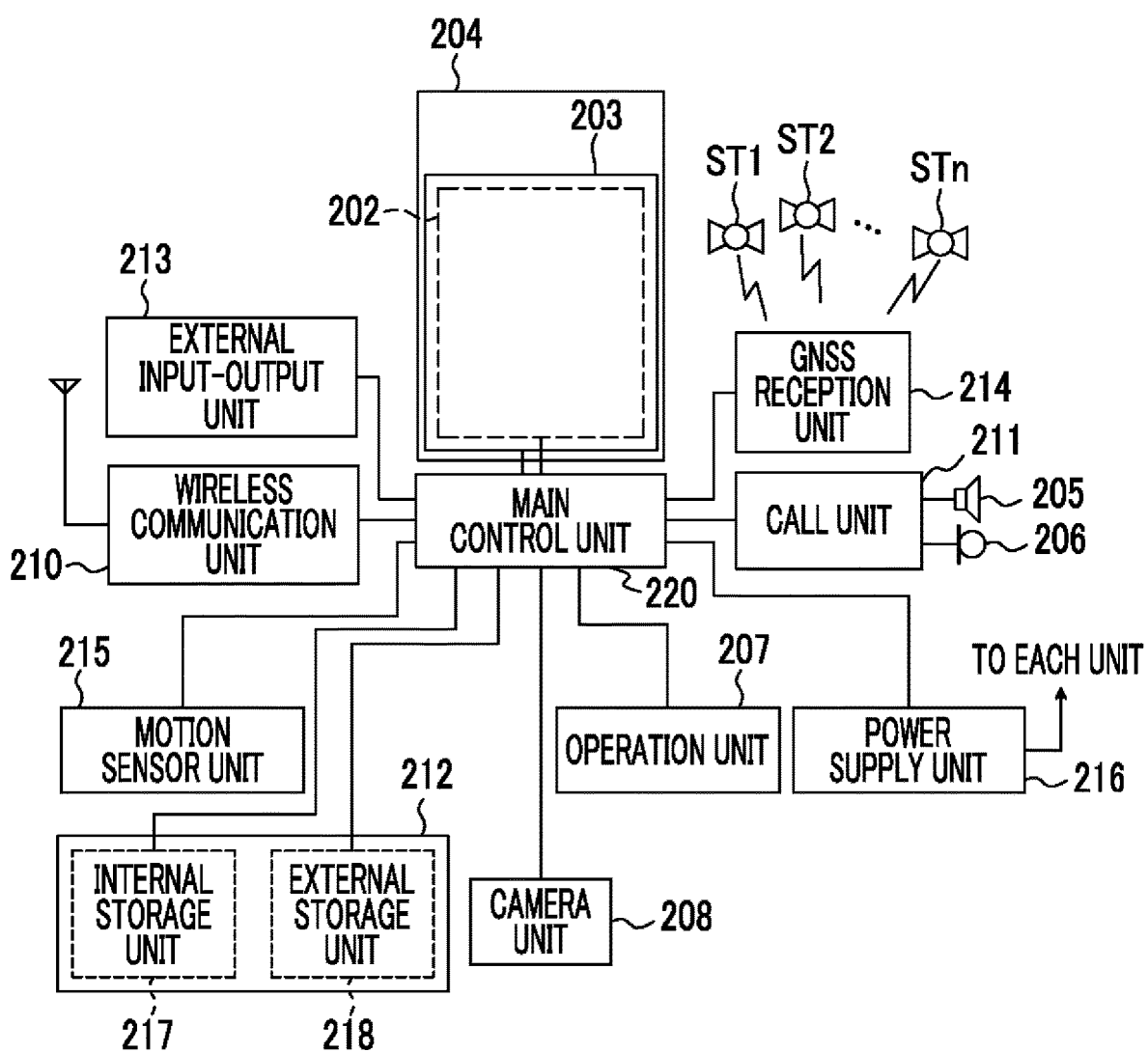
FIG. 10 is a block diagram illustrating a configuration of the smartphone 200 illustrated in FIG. 9.

FIG. 10 is a block diagram illustrating a configuration of the smartphone 200 illustrated in FIG. 9.

As illustrated in FIG. 10, a wireless communication unit 210, the display and input unit 204, a call unit 211, the operation unit 207, the camera unit 208, a storage unit 212, an external input-output unit 213, a global navigation satellite system (GNSS) reception unit 214, a motion sensor unit 215, a power supply unit 216, and a main control unit 220 are comprised as main constituents of the smartphone.

In addition, a wireless communication function of performing mobile wireless communication with a base station apparatus, not illustrated, through a mobile communication network, not illustrated, is provided as a main function of the smartphone 200.

The wireless communication unit 210 performs wireless communication with the base station apparatus accommodated in the mobile communication network in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and detects a user operation with respect to the displayed information under control of the main control unit 220. The display and input unit 204 comprises the display panel 202 and the operation panel 203.

A liquid crystal display (LCD), an organic electro-luminescence display (OELD), or the like is used as a display device in the display panel 202.

The operation panel 203 is a device that is placed such that an image displayed on the display surface of the display panel 202 can be visually recognized, is operated by a finger of the user or a stylus, and detects one or a plurality of coordinates. In a case where the device is operated by the finger of the user or the stylus, a detection signal generated by the operation is output to the main control unit 220. Next, the main control unit 220 detects an operation position (coordinates) on the display panel 202 based on the received detection signal.

As illustrated in FIG. 10, the display panel 202 and the operation panel 203 of the smartphone 200 illustrated as the imaging apparatus according to one embodiment of the present invention are integrated and constitute the display and input unit 204. The operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part in overlap with the display panel 202 and a detection region (hereinafter, referred to as a non-display region) for an edge part other than the overlapping part that is not in overlap with the display panel 202.

The size of the display region and the size of the display panel 202 may completely match, but both sizes do not need to match. In addition, the operation panel 203 may comprise two sensitive regions of the edge part and an inner part other than the edge part. Furthermore, the width of the edge part is appropriately designed depending on the size and the like of the casing 201.

Furthermore, as a position detection method employed in the operation panel 203, a matrix switch method, a resistive film method, a surface acoustic wave method, an infrared method, an electromagnetic induction method, an electrostatic capacitive method, and the like are exemplified, and any of the methods can be employed.

The call unit 211 comprises the speaker 205 or the microphone 206 and converts voice of the user input through the microphone 206 into voice data processable in the main control unit 220 and outputs the voice data to the main control unit 220, or decodes voice data received by the wireless communication unit 210 or the external input-output unit 213 and outputs the decoded voice data from the speaker 205.

In addition, as illustrated in FIG. 9, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 9, the operation unit 207 is a push-button type switch that is mounted on a side surface of the casing 201 of the smartphone 200 and enters an ON state in a case where the switch is pressed by the finger or the like, and enters an OFF state by restoring force of a spring or the like in a case where the finger is released.

The storage unit 212 stores a control program and control data of the main control unit 220, application software, address data in which a name, a telephone number, or the like of a communication counterpart is associated, transmitted and received electronic mail data, web data downloaded by web browsing, and downloaded contents data, and temporarily stores streaming data or the like. In addition, the storage unit 212 is configured with an internal storage unit 217 incorporated in the smartphone and an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication or the like (for example, Universal Serial Bus (USB), IEEE1394, Bluetooth (registered trademark), radio frequency identification (RFID), infrared communication (Infrared Data Association (IrDA) (registered trademark)), Ultra Wideband (UWB) (registered trademark), or ZigBee (registered trademark)) or through a network (for example, the Ethernet (registered trademark) or a wireless local area network (LAN)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GNSS reception unit 214 receives GNSS signals transmitted from GNSS satellites ST1 to STn, executes a position measurement calculation process based on the received plurality of GNSS signals, and detects a position that includes a latitude, a longitude, and an altitude of the smartphone 200 in accordance with an instruction from the main control unit 220. In a case where positional information can be acquired from the wireless communication unit 210 or the external input-output unit 213 (for example, a wireless LAN), the GNSS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or an acceleration of the smartphone 200 is detected. The detection result is output to the main control unit 220.

The power supply unit 216 supplies power stored in a battery (not illustrated) to each unit of the smartphone 200 in accordance with an instruction from the main control unit 220.

The main control unit 220 comprises a microprocessor, operates in accordance with the control program and the control data stored in the storage unit 212, and manages and controls each unit of the smartphone 200. The microprocessor of the main control unit 220 has the same function as the system control unit 11. In addition, the main control unit 220 has a mobile communication control function of controlling each unit of a communication system and an application processing function for performing voice communication or data communication through the wireless communication unit 210.

The application processing function is implemented by operating the main control unit 220 in accordance with the application software stored in the storage unit 212. For example, the application processing function is an infrared communication function of performing data communication with an opposing apparatus by controlling the external input-output unit 213, an electronic mail function of transmitting and receiving electronic mails, or a web browsing function of browsing a web page.

In addition, the main control unit 220 has an image processing function such as displaying a video on the display and input unit 204 based on image data (data of a still image or a motion image) such as reception data or downloaded streaming data.

The image processing function refers to a function of causing the main control unit 220 to decode the image data, perform image processing on the decoding result, and display an image on the display and input unit 204.

Furthermore, the main control unit 220 executes display control for the display panel 202 and operation detection control for detecting the user operation through the operation unit 207 and the operation panel 203.

By executing the display control, the main control unit 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 has a touch panel control function of determining whether the operation position on the operation panel 203 is in the overlapping part (display region) in overlap with the display panel 202 or the other edge part (non-display region) not in overlap with the display panel 202 and controlling the sensitive region of the operation panel 203 or a display position of the software key.

In addition, the main control unit 220 can detect a gesture operation with respect to the operation panel 203 and execute a preset function depending on the detected gesture operation.

The gesture operation is not a simple touch operation in the related art and means an operation of drawing a trajectory by the finger or the like, designating a plurality of positions at the same time, or drawing a trajectory for at least one of the plurality of positions as a combination thereof.

The camera unit 208 includes the imaging unit 50 in the digital camera illustrated in FIG. 1.

Captured image data generated by the camera unit 208 can be stored in the storage unit 212 or be output through the external input-output unit 213 or the wireless communication unit 210.

In the smartphone 200 illustrated in FIG. 9, the camera unit 208 is mounted on the same surface as the display and input unit 204. However, the mount position of the camera unit 208 is not for limitation purposes. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in a case where the GNSS reception unit 214 detects the position, the position can be detected by referring to the image from the camera unit 208. Furthermore, by referring to the image from the camera unit 208, an optical axis direction of the camera unit 208 of the smartphone 200 can be determined, or the current usage environment can be determined without using the three-axis acceleration sensor or using the three-axis acceleration sensor. The image from the camera unit 208 can also be used in the application software.

Besides, image data of a still image or a motion image to which the positional information acquired by the GNSS reception unit 214, voice information (may be text information acquired by performing voice to text conversion by the main control unit or the like) acquired by the microphone 206, attitude information acquired by the motion sensor unit 215, or the like is added can be stored in the storage unit 212 or be output through the external input-output unit 213 or the wireless communication unit 210.

Even in the smartphone 200 having the above configuration, the focusing control can be performed with high frequency.

As described above, at least the following matters are disclosed in the present specification. While corresponding constituents and the like in the embodiment are shown in parentheses, the present invention is not limited thereto.

(1) An imaging apparatus comprising an imaging element (imaging element 5) including a first light-receiving region (pixel line 63) in which a pixel group including focal point detection pixels (the focal point detection pixel 61b and the focal point detection pixel 61c) is arranged and a second light-receiving region (pixel line 62) in which a pixel group not including the focal point detection pixels is arranged, and a processor (system control unit 11), in which the processor is configured to perform a first control (recording imaging control) of causing the imaging element to perform imaging in a first exposure time period (exposure time period EX1), and perform a second control (display imaging control) of causing the imaging element to perform imaging by setting an exposure time period of the second light-receiving region as the first exposure time period and setting an exposure time period of the first light-receiving region as a second exposure time period (exposure time period EX2).

(2) The imaging apparatus according to (1), in which the second exposure time period and the first exposure time period are different.

(3) The imaging apparatus according to (2), in which the second exposure time period is longer than the first exposure time period.

(4) The imaging apparatus according to any one of (1) to (3), in which each of the first light-receiving region and the second light-receiving region is configured with a plurality of pixel lines.

(5) The imaging apparatus according to any one of (1) to (4), in which the processor is configured to perform the first control a plurality of times, the first control including a preceding first control and a subsequent first control that is the first control performed next to the preceding first control, and perform the second control at least once between the first control and a subsequent first control performed next to the preceding first control.

(6) The imaging apparatus according to (5), in which the processor is configured to continuously perform the second control a plurality of times between the preceding first control and the subsequent first control performed next to the preceding first control, and continue exposure of the first light-receiving region during the plurality of times of the second control.

(7) The imaging apparatus according to (6), in which the processor is configured to output a signal from the pixel group of the second light-receiving region after a start of the plurality of times of the second control for each of the plurality of times of the second control.

(8) The imaging apparatus according to any one of (1) to (7), in which the processor is configured to use image data based on a signal output from the imaging element by the first control for recording and displaying, and use image data based on a signal output from the pixel group of the second light-receiving region by the second control for only displaying out of recording and displaying.

(9) The imaging apparatus according to (8), in which the processor is configured to use a first signal output from the pixel group of the first light-receiving region by the first control for driving a focus lens arranged between the imaging element and a subject, and use a second signal output from the pixel group of the first light-receiving region by the second control for driving the focus lens.

(10) The imaging apparatus according to (9), in which the processor is configured to, based on a first drive amount of the focus lens decided based on the first signal output from the pixel group of the first light-receiving region by the first control and a second drive amount of the focus lens decided based on the second signal output from the pixel group of the first light-receiving region by the second control after the first control, predict a drive amount of the focus lens in a subsequent first control, and set a weighting coefficient of the first drive amount used for predicting the drive amount to be smaller than a weighting coefficient of the second drive amount.

(11) The imaging apparatus according to (10), in which the processor is configured to control the weighting coefficient of the first drive amount based on an imaging condition in the first control.

(12) The imaging apparatus according to any one of (1) to (11), in which the processor is configured to set the second exposure time period in accordance with brightness of a subject imaged by the imaging element, perform the first control a plurality of times, the first control including a preceding first control and a subsequent first control that is the first control performed next to the preceding first control, perform the second control at least once between the first control and the subsequent first control performed next to the preceding first control, and increase imaging sensitivity of the imaging element in the second control in a case where appropriate exposure of the first light-receiving region decided in accordance with the brightness of the subject is not obtained in the second control performed once even by setting the second exposure time period to an upper limit value (longest exposure time period) per second control.

(13) The imaging apparatus according to (12), in which the processor is configured to, in a case where the appropriate exposure is not obtained even by setting the second exposure time period to the upper limit value and setting the imaging sensitivity to a predetermined upper limit value, continuously perform the second control a plurality of times between the preceding first control and the subsequent first control performed next to the preceding first control and continue exposure of the first light-receiving region during the plurality of times of the second control.

(14) The imaging apparatus according to (12), in which the processor is configured to, in a case where the appropriate exposure is not obtained even by setting the second exposure time period to the upper limit value and setting the imaging sensitivity to a predetermined upper limit value, perform the second control by setting the second exposure time period to the upper limit value and setting the imaging sensitivity to the predetermined upper limit value as long as information based on signals output from the focal point detection pixels satisfies a predetermined condition.

(15) The imaging apparatus according to (14), in which the processor is configured to, in a case where the appropriate exposure is not obtained and the predetermined condition is not satisfied even by setting the second exposure time period to the upper limit value and setting the imaging sensitivity to the predetermined upper limit value, continuously perform the second control a plurality of times between the first control and the subsequent first control and continue exposure of the first light-receiving region during the plurality of times of the second control.

(16) An imaging control method of controlling an imaging element including a first light-receiving region in which a pixel group including focal point detection pixels is arranged and a second light-receiving region in which a pixel group not including the focal point detection pixels is arranged, the imaging control method comprising performing a first control of causing the imaging element to perform imaging in a first exposure time period, and performing a second control of causing the imaging element to perform imaging by setting an exposure time period of the second light-receiving region as the first exposure time period and setting an exposure time period of the first light-receiving region as a second exposure time period.

(17) A non-transitory computer recording medium storing a n imaging control program for controlling an imaging element including a first light-receiving region in which a pixel group including focal point detection pixels is arranged and a second light-receiving region in which a pixel group not including the focal point detection pixels is arranged, the imaging control program causing a processor to perform a first control of causing the imaging element to perform imaging in a first exposure time period, and perform a second control of causing the imaging element to perform imaging by setting an exposure time period of the second light-receiving region as the first exposure time period and setting an exposure time period of the first light-receiving region as a second exposure time period.

EXPLANATION OF REFERENCES

1: imaging lens
2: stop
4: lens control unit
5: imaging element
8: lens drive unit
9: stop drive unit
10: imaging element drive unit
11: system control unit
14, 207: operation unit
15: memory control unit
16: memory
17: digital signal processing unit
20: external memory control unit 21: recording medium
22a: display controller
22b: display surface
22: display device
24: control bus
25: data bus
40: lens device
50: imaging unit
60: imaging surface
61a: normal pixel
61b, 61c: focal point detection pixel
61: pixel
62, 63: pixel line
64: drive circuit
65: signal processing circuit
71, 72: frame period
100A: main body unit
100: digital camera
200: smartphone
201: casing
202: display panel
203: operation panel
204: display and input unit
205: speaker
206: microphone
208: camera unit
210: wireless communication unit
211: call unit
212: storage unit
213: external input-output unit
214: GNSS reception unit
215: motion sensor unit
216: power supply unit
217: internal storage unit
218: external storage unit
220: main control unit

What is claimed is:

1. An imaging apparatus comprising:
an imaging element including a first light-receiving region in which a pixel group including focal point detection pixels is arranged and a second light-receiving region in which a pixel group not including the focal point detection pixels is arranged; and
a processor,
wherein the processor is configured to
perform a first control of causing the imaging element to perform imaging in a first exposure time period, and
perform a second control of causing the imaging element to perform imaging by setting an exposure time period of the second light-receiving region as the first exposure time period and setting an exposure time period of the first light-receiving region as a second exposure time period.

2. The imaging apparatus according to claim 1,
wherein the second exposure time period and the first exposure time period are different.

3. The imaging apparatus according to claim 2,
wherein the second exposure time period is longer than the first exposure time period.

4. The imaging apparatus according to claim 1,
wherein each of the first light-receiving region and the second light-receiving region is configured with a plurality of pixel lines.

5. The imaging apparatus according to claim 1,
wherein the processor is configured to
perform the first control a plurality of times, the first control including a preceding first control and a subsequent first control that is the first control performed next to the preceding first control, and
perform the second control at least once between the preceding first control and the subsequent first control performed next to the preceding first control.

6. The imaging apparatus according to claim 5,
wherein the processor is configured to
continuously perform the second control a plurality of times between the preceding first control and the subsequent first control performed next to the preceding first control, and
continue exposure of the first light-receiving region during the plurality of times of the second control.

7. The imaging apparatus according to claim 6,
wherein the processor is configured to output a signal from the pixel group of the second light-receiving region after a start of the plurality of times of the second control for each of the plurality of times of the second control.

8. The imaging apparatus according to claim 1,
wherein the processor is configured to
use image data based on a signal output from the imaging element by the first control for recording and displaying, and
use image data based on a signal output from the pixel group of the second light-receiving region by the second control for only displaying out of recording and displaying.

9. The imaging apparatus according to claim 8,
wherein the processor is configured to
use a first signal output from the pixel group of the first light-receiving region by the first control for driving a focus lens arranged between the imaging element and a subject, and
use a second signal output from the pixel group of the first light-receiving region by the second control for driving the focus lens.

10. The imaging apparatus according to claim 9,
wherein the processor is configured to,
based on a first drive amount of the focus lens decided based on the first signal output from the pixel group of the first light-receiving region by the first control and a second drive amount of the focus lens decided based on the second signal output from the pixel group of the first light-receiving region by the second control after the first control, predict a drive amount of the focus lens in a subsequent first control, and
set a weighting coefficient of the first drive amount used for predicting the drive amount to be smaller than a weighting coefficient of the second drive amount.

11. The imaging apparatus according to claim 10,
wherein the processor is configured to control the weighting coefficient of the first drive amount based on an imaging condition of the first control.

12. The imaging apparatus according to claim 1,
wherein the processor is configured to
set the second exposure time period in accordance with brightness of a subject imaged by the imaging element,
perform the first control a plurality of times, the first control including a preceding first control and a subsequent first control that is the first control performed next to the preceding first control, perform the second control at least once between the preceding first control and the subsequent first control performed next to the preceding first control, and increase imaging sensitivity of the imaging element in the second control in a case where appropriate exposure of the first light-receiving region decided in accordance with the brightness of the subject is not obtained in the second control performed once even by setting the second exposure time period to an upper limit value per second control.

13. The imaging apparatus according to claim 12, wherein the processor is configured to, in a case where the appropriate exposure is not obtained even by setting the second exposure time period to the upper limit value and setting the imaging sensitivity to a predetermined upper limit value, continuously perform the second control a plurality of times between the preceding first control and the subsequent first control performed next to the preceding first control and continue exposure of the first light-receiving region during the plurality of times of the second control.

14. The imaging apparatus according to claim 12, wherein the processor is configured to, in a case where the appropriate exposure is not obtained even by setting the second exposure time period to the upper limit value and setting the imaging sensitivity to a predetermined upper limit value, perform the second control by setting the second exposure time period to the upper limit value and setting the imaging sensitivity to the predetermined upper limit value as long as information based on signals output from the focal point detection pixels satisfies a predetermined condition.

15. The imaging apparatus according to claim 14, wherein the processor is configured to, in a case where the appropriate exposure is not obtained and the predetermined condition is not satisfied even by setting the second exposure time period to the upper limit value and setting the imaging sensitivity to the predetermined upper limit value, continuously perform the second control a plurality of times between the preceding first control and the subsequent first control performed next to the preceding first control and continue exposure of the first light-receiving region during the plurality of times of the second control.

16. An imaging control method of controlling an imaging element including a first light-receiving region in which a pixel group including focal point detection pixels is arranged and a second light-receiving region in which a pixel group not including the focal point detection pixels is arranged, the imaging control method comprising:

performing a first control of causing the imaging element to perform imaging in a first exposure time period; and performing a second control of causing the imaging element to perform imaging by setting an exposure time period of the second light-receiving region as the first exposure time period and setting an exposure time period of the first light-receiving region as a second exposure time period.

17. A non-transitory computer recording medium storing a n imaging control program for controlling an imaging element including a first light-receiving region in which a pixel group including focal point detection pixels is arranged and a second light-receiving region in which a pixel group not including the focal point detection pixels is arranged, the imaging control program causing a processor to:

perform a first control of causing the imaging element to perform imaging in a first exposure time period; and perform a second control of causing the imaging element to perform imaging by setting an exposure time period of the second light-receiving region as the first exposure time period and setting an exposure time period of the first light-receiving region as a second exposure time period.

\* \* \* \* \*